Figure 1:
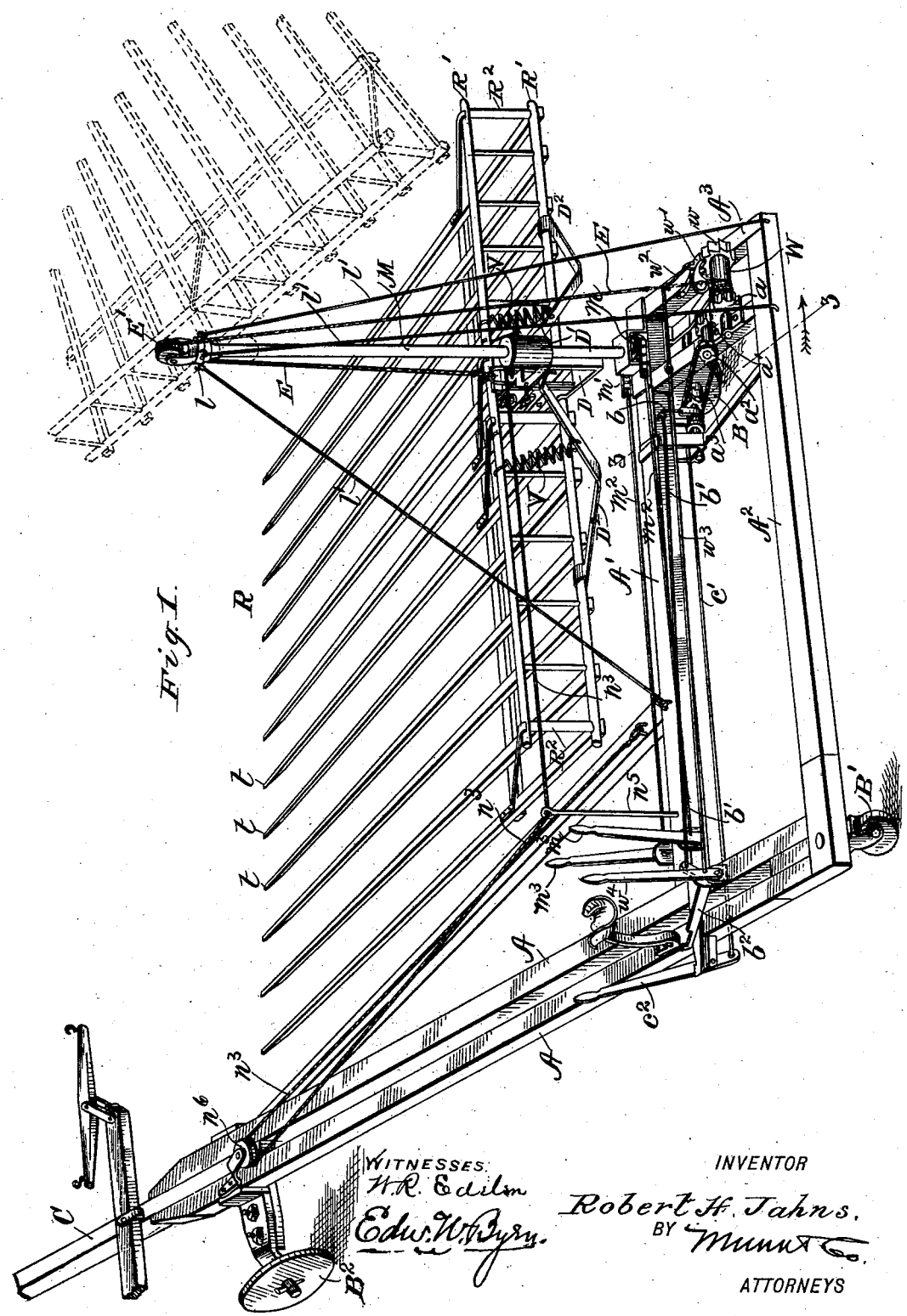

No. 689,724. Patented Dec. 24, 1901.
R. H. JAHNS.
COMBINED RAKE AND STACKER.
(Application filed Aug. 21, 1901.)
(No Model.) 3 Sheets—Sheet 1.

WITNESSES:
W. R. Edelin
Edw. W. Byrn.

INVENTOR
Robert H. Jahns.
BY Munn & Co.
ATTORNEYS

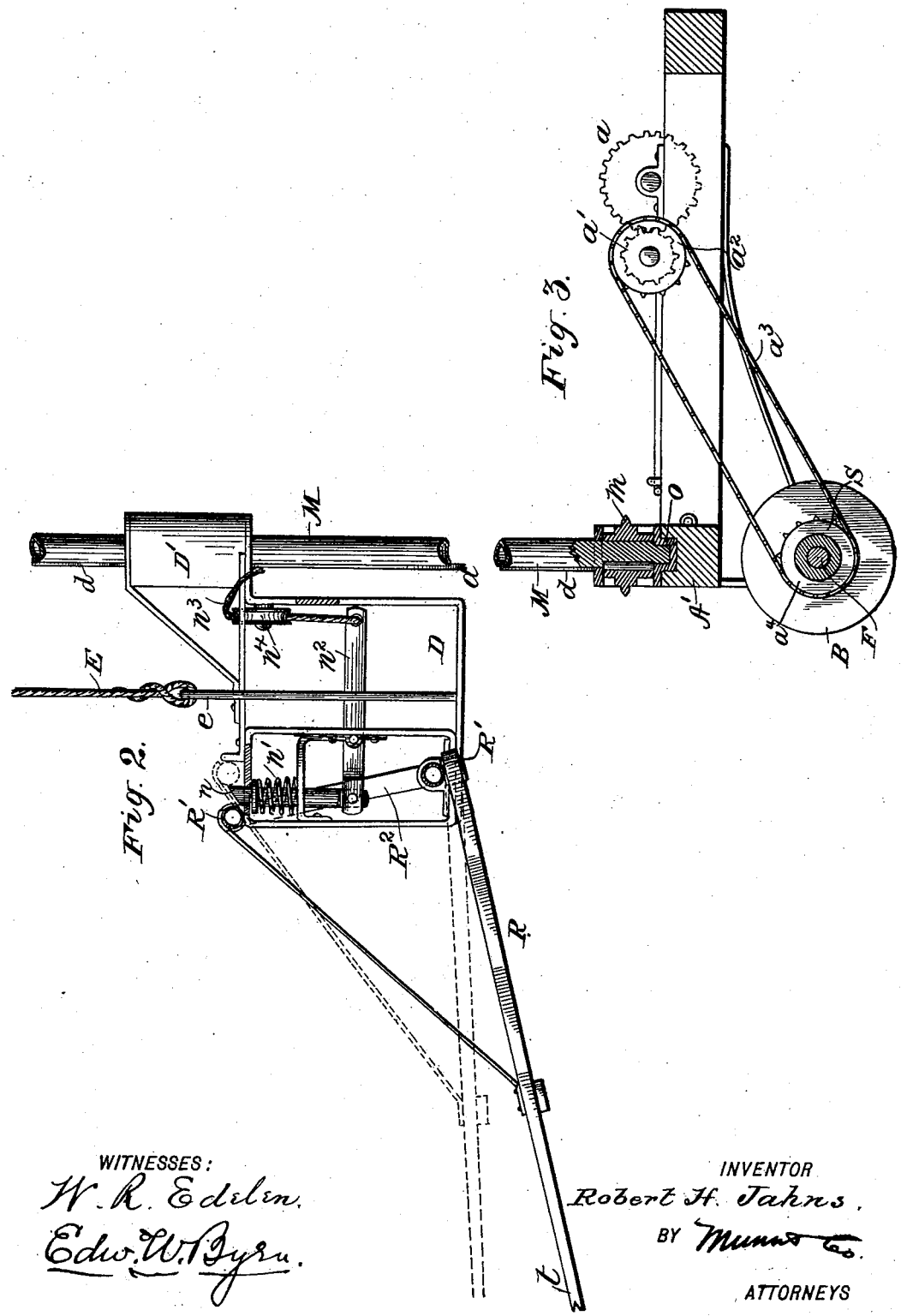

No. 689,724. Patented Dec. 24, 1901.
R. H. JAHNS.
COMBINED RAKE AND STACKER.
(Application filed Aug. 21, 1901.)
(No Model.) 3 Sheets—Sheet 3.
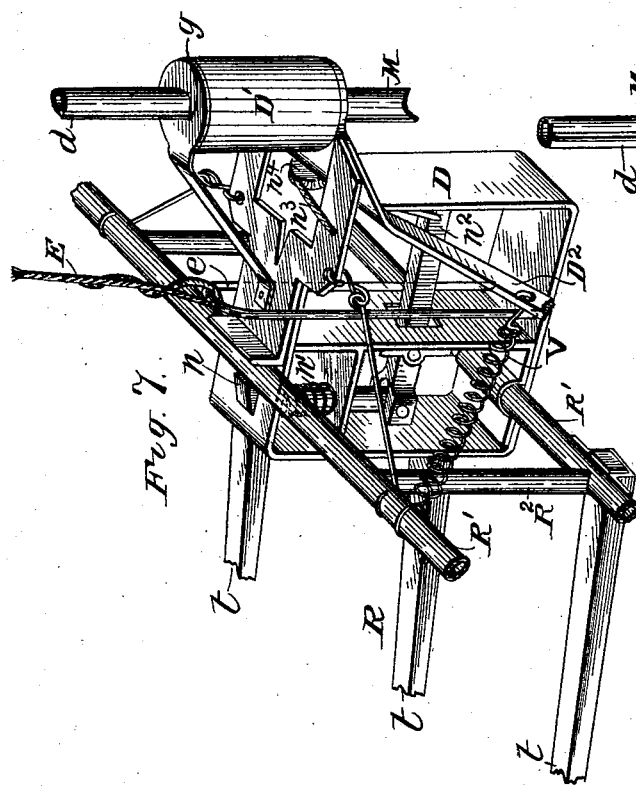
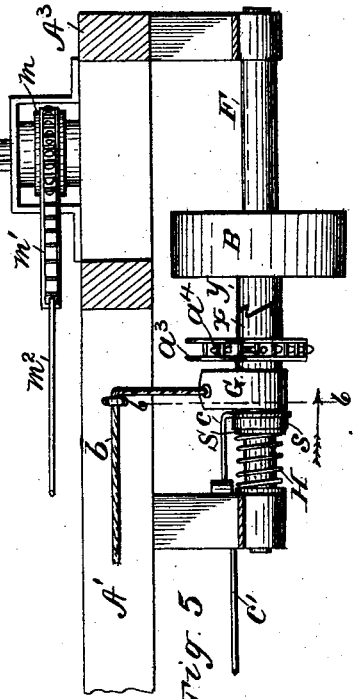
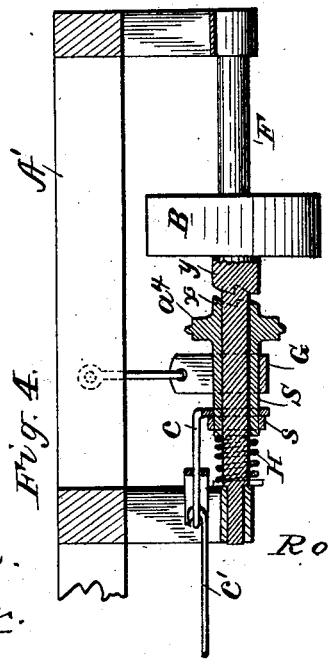
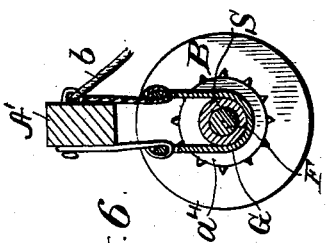
WITNESSES:
W. R. Edelen.
Edw. W. Byrn.
INVENTOR
Robert H. Jahns.
BY Munn & Co.
ATTORNEYS
THE NORRIS PETERS CO., PHOTO-LITHO., WASHINGTON, D. C.

UNITED STATES PATENT OFFICE.

ROBERT HERMAN JAHNS, OF MIAMI, TEXAS.

COMBINED RAKE AND STACKER.

SPECIFICATION forming part of Letters Patent No. 689,724, dated December 24, 1901.

Application filed August 21, 1901. Serial No. 72,746. (No model.)

*To all whom it may concern:*

Be it known that I, ROBERT HERMAN JAHNS, of Miami, in the county of Roberts and State of Texas, have invented a new and useful Improvement in a Combined Rake and Stacker, of which the following is a specification.

My invention is designed to provide a horse-rake for hay, &c., which shall be so constructed as to enable it to be used for loading the hay onto the wagon or piling it onto a stack; and it consists in the peculiar construction and arrangement of the various parts of the same, which I will now proceed to describe with reference to the drawings, in which—

Figure 1 is a perspective view from the rear, showing in dotted lines the position of the rake when elevated and turned to one side for loading or stacking. Fig. 2 is a detail, partly in section, showing the rake and rake-head in its relation to the mast. Fig. 3 is an enlarged sectional view on the line 3 3 of Fig. 1. Figs. 4 and 5 are respectively views of the clutch mechanism and main driving-wheel under the mast. Fig. 6 is a cross-section on line 6 6 of Fig. 5, and Fig. 7 is a detail in perspective of the rake-head and tripping mechanism.

In the drawings, Fig. 1, A A represent two parallel bars arranged in the line of draft and bolted or otherwise connected in the rear to two bars A' A² at right angles, which bars A' A² at their outer ends are connected by a cross-bar A³, the whole forming the main frame of the device. This main frame is supported by three wheels, which run upon the ground. One of these, B, is under the outer end of the bar A'. The other one, B', is under the rear ends of the bars A A, and the other one, B², is journaled on an arm projecting from the forward end of the bars A A on the opposite side from the rake. Between the front ends of the parallel bars A A is jointed the tongue C, to which is connected, in the usual way, the draft attachment for the team.

R is the rake, which is supported from the mast M in front of the portion A' A² of the framework. This rake has long teeth or tines $t$ pointing forward and which dip down sufficiently close to the ground to gather up the hay or grain as the machine is dragged forward by the team across the field. When a sufficient quantity of hay or other material is gathered, the rake is to be raised upon the mast M, the mast rotated about its vertical axis till the rake occupies the position shown in dotted lines, and the rake is then dumped either upon the wagon or stack.

I will first describe the means for raising and turning the rake.

The rake (see Figs. 2 and 7) has a head formed of two horizontal hollow metal rods R' R', having vertical transverse pieces R², to which head is firmly fastened in the middle the metal framework D. This framework has firmly attached to its upper end a strong sleeve D', which slides vertically on the mast M and has a groove $g$, Fig. 7, that fits a longitudinal feather or spline $d$, extending the full length of the mast. This rake and its frame D are suspended and raised and lowered by a yoke $e$ and a rope E. This rope is attached to the yoke and extends over a pulley E' at the top of the mast (see Fig. 1) and thence descends to and is wound upon a windlass W. This windlass is connected by suitable gears to the driving mechanism, and when it is turned it winds up the rope E and raises the rake along the mast. To hold the rake in its elevated position, a pawl $w'$ is made to engage the ratchet-wheel $w$ on the end of the windlass, and when the rake is to be lowered the pawl is withdrawn from the ratchet by a rope $w^2$ and a pull-rod $w^3$, extending to a lever $w^4$ near the driver's seat. The windlass is rotated (see Figs. 1 and 3) by a gear-wheel $a$ on its end meshing with a pinion $a'$ on the same shaft with a sprocket-wheel $a^2$, which derives motion through a chain belt $a^3$ from a sprocket-wheel $a^4$. The sprocket-wheel $a^4$ (see Figs. 4 and 5) is formed on or rigidly attached to a sleeve S, sliding on a shaft F, journaled in hangers under the frame-bar A'. To this shaft is rigidly attached the main running and driving-wheel B. This wheel is located nearly under the mast M, so that the weight of the load on the rake will come directly over the wheel B and hold it to the ground firmly enough to insure its positive rotation, so as to drive the windlass-gears with power. Beside the driving-wheel B there is formed a clutch-section $y$, and on the end of the sleeve S is formed another clutch-section $x$, which may be thrown into or out of engagement with the clutch-section $y$. When these clutch-sections are engaged, the rotation of wheel B turns the sleeve S and the sprocket-wheel $a^4$ and through the chain belt the windlass-gears. To hold the clutch-sections engaged, a helical spring H is arranged on shaft F to force the sleeve S and its clutch-section $x$ toward the other clutch-section $y$. When the rake has been raised and its load dumped, the rake is to be lowered. To do this, the pawl is first removed from the ratchet of the windlass, the clutches separated, and the windlass allowed to run backward, as the rake descends of its own weight. To separate the clutches, a swiveling collar or fork $c$ embraces the sleeve behind its flange $s$, and the sleeve is pulled back against the spring H by means of a pull-rod $c'$, connected (see Fig. 1) to a lever $c^2$ near the driver's seat. To regulate the descent of the rake, a friction-brake strap G, Figs. 4 and 5, embraces the sleeve S and is tightened thereabout (see Figs. 1 and 5) by a rope $b$, pull-rod $b'$, and treadle $b^2$ near the driver's seat.

I will now describe the means for rotating the rake about a vertical axis, so as to dump it to one side after having been raised. For this purpose the vertical mast is stepped in a bearing $o$ on the frame-bar A' (see Fig. 3) and has rigidly attached to its lower end a sprocket-wheel $m$, around which passes a chain $m'$, Fig. 5, whose two ends are attached to two parallel rods $m^2$ $m^2$, Fig. 1, running to two levers $m^3$ $m^3$ near the driver's seat. By pulling on one of these levers and pushing the other the mast is rotated in the step and may be turned first in one direction and then in the other, and being connected to the sleeve of the rake-head by the feather the rake swings with the mast. The upper end of the mast swivels inside of a collar $l$, which is held and stayed to the framework by guy-rods $l'$ $l'$ $l'$.

After the rake has been raised and turned around to the dotted position in Fig. 1 it is dumped as follows, reference being had especially to Figs. 2 and 7. A spring-bolt $n$, with a beveled face, slides vertically in the frame D. The bolt is held up by the spring $n'$ and is drawn down by the lever $n^2$, pivoted on one side of its fulcrum to the lower end of the bolt and on the other side attached to the rope $n^3$, which passes around the pulley $n^4$, and thence (see Fig. 1) passes to a standard $n^5$ and through an eye in its top goes to a pulley $n^6$ near the tongue and then extends back to and is secured to any portion of the framework. Referring again to Fig. 2, the upper member R' of the rake-head is locked behind the bolt $n$, as shown in dotted lines, while the rake is rising with its load. When the load is to be dumped, a pull on the rope $n^3$ draws down the bolt $n$, and the weight of the hay on the rake causes it to drop to the position shown in full lines in Fig. 2, which allows the hay to slide off. When relieved of the weight of the hay, the rake rises to the dotted position again, and the upper member R' of its head passes over the inclined face of bolt $n$ and is locked behind it. The power to do this is furnished by two springs V V, Figs. 1 and 7, connecting the upper member R' of the rake-head to braces $D^2$ $D^2$ from the frame D. By extending the trip-rope $n^3$ to various parts of the framework it may be seized to dump the load from various points where the operator happens to be.

Having thus described my invention, what I claim as new, and desire to secure by Letters Patent, is—

1. A combined hay rake and stacker, comprising a frame with running wheels and draft attachments, a single rotatable mast and a rake having a head slidably supported on said mast embracing but connected with it so as to rotate with it, means for raising and lowering the rake, and means for rotating the mast and rake together substantially as described.

2. A combined hay rake and stacker, comprising a frame consisting of two parallel bars in the line of draft having a tongue and draft attachment at its front end and a frame at its rear end projecting at right angles, supporting-wheels at the front and rear ends, and a supporting and driving wheel at the outer end of the right-angularly-projecting frame, a single rotatable mast erected over said wheel, and a rake slidably supported on said mast and arranged to rotate therewith and having a hoisting-rope and a windlass and gears, said gears being actuated by the running wheel under the mast substantially as described.

3. In a hay rake and stacker, a frame, a single rotatable vertical mast mounted on said frame, a running wheel arranged beneath the frame at a point near the mast, so as to carry its weight, a rake slidably mounted on said mast but arranged to rotate with it, a rope for raising and lowering the rake, means for rotating the mast, and a windlass and gears actuated by the running wheel under the mast substantially as described.

4. In a hay rake and stacker, a frame, running and driving wheels, a vertical mast mounted on said frame above the driving-wheel and arranged to turn about a vertical axis, guys for holding said mast, a rake with sleeve sliding on said mast, said sleeve and mast having a feather-and-groove connection, a rope for raising and lowering said rake, a windlass and gears connected to and operated by the running wheel under the mast, and means for rotating the mast substantially as described.

5. In a hay rake and stacker, a frame, a single rotatable vertical mast mounted on said frame, a running wheel arranged beneath the frame at a point near the mast, a rake slidably mounted on said mast, but arranged to turn with it, means for rotating the mast, means for raising and lowering the rake, and means for regulating its descent substantially as described.

6. In a hay rake and stacker, a framework having a step-bearing and mast erected thereon, a sprocket-wheel attached to the lower end of said mast, a chain passing around said sprocket-wheel, two levers and two rods attached respectively to the ends of said chain, a swiveling collar for the top of said mast, guys connecting the swiveling collar to the frame, and a rake slidably arranged upon the mast substantially as shown and described.

7. In a hay rake and stacker, a single rotatable vertical mast, a frame slidably mounted on said mast but arranged to rotate therewith, a rake hinged horizontally thereto, a spring locking-bolt to hold the rake up, a lever and pull-rope connecting to the said bolt to trip it, and springs for restoring the rake substantially as shown and described.

8. In a hay rake and stacker, a vertical mast, a frame D with sleeve D' sliding on said mast, a rake having a head comprising two horizontal rods R' R' the lower one hinged to the frame, a vertical spring-bolt $n$ sliding in the frame D and locking against the upper rod R', the trip-lever $n^2$, and the rope and pulley $n^3$ $n^4$ substantially as shown and described.

9. In a hay rake and stacker, the combination with the vertical mast and the rake slidably mounted thereon; of a windlass, a ratchet and pawl with rope for operating the pawl, a shaft with running wheel arranged under the mast, said shaft bearing a clutch-face, a sliding sleeve with clutch-face and sprocket-wheel, a spring for holding the clutches engaged, a pull-rod for separating the clutches, a brake for regulating the back movement of the sleeve, and a hoisting-rope for the rake, and gears and chain belt connecting said windlass with the sprocket-wheel on the sleeve substantially as described.

10. In a hay rake and stacker, the combination with a single rotatable mast and a rake slidably supported thereon and arranged to rotate therewith; of a hoisting device for the rake, means for rotating the mast, driving-gears, a clutch in the driving-gears, and a brake for regulating the backward movement substantially as described.

ROBERT HERMAN JAHNS.

Witnesses:
IRA J. CULVER,
THOMAS J. BONEY.